US007144555B1

(12) United States Patent
Squires et al.

(10) Patent No.: US 7,144,555 B1
(45) Date of Patent: Dec. 5, 2006

(54) METHOD AND APPARATUS FOR HYDROGEN SULPHIDE REMOVAL

(75) Inventors: Stuart Squires, Sedgewick (CA); Orest Reminsky, Edmonton (CA); Bryan Campbell, Calgary (CA)

(73) Assignee: Well to Wire Emissions Control Inc., Calgary (CA)

( * ) Notice: Subject to any disclaimer, the term of this patent is extended or adjusted under 35 U.S.C. 154(b) by 634 days.

(21) Appl. No.: 09/681,881

(22) Filed: Jun. 20, 2001
(Under 37 CFR 1.47)

(51) Int. Cl.
*B01D 53/52* (2006.01)

(52) U.S. Cl. .................................................... 422/168

(58) Field of Classification Search ................ 422/168, 422/169, 176, 177, 188, 190, 193
See application file for complete search history.

(56) References Cited

U.S. PATENT DOCUMENTS 1,360,734 A 11/1920 Doherty
1,626,664 A 5/1927 Brady
1,816,533 A 7/1931 Huff et al.
1,875,920 A 9/1932 Gordon et al.
2,137,602 A 11/1938 Bachr, et al.
2,232,048 A 2/1941 Bolt et al.
2,663,674 A 12/1953 Krause et al.
2,866,679 A 12/1958 Lamont
2,983,573 A * 5/1961 Moore et al. ............... 423/231
3,421,850 A 1/1969 Peterson et al.
3,761,569 A 9/1973 Heiba et al.
4,123,506 A 10/1978 Spevack
4,163,043 A 7/1979 Dezael et al.
4,202,864 A 5/1980 Spevack
4,238,463 A 12/1980 Nicksic
4,242,305 A 12/1980 Spevack
4,324,776 A 4/1982 Kim
4,518,572 A 5/1985 Ritter
4,596,698 A 6/1986 Spevack
4,722,799 A * 2/1988 Ashbrook et al. .......... 210/722
4,956,160 A 9/1990 Reichert
5,147,620 A 9/1992 Rozsa
5,700,438 A 12/1997 Miller
5,792,438 A 8/1998 Scranton, Jr.

FOREIGN PATENT DOCUMENTS

JP 5-220331 * 8/1993

* cited by examiner

*Primary Examiner*—Kevin P. Kerns
(74) *Attorney, Agent, or Firm*—Bennett Jones LLP

(57) ABSTRACT

A method for removing hydrogen sulphide and carbon dioxide from a gas stream includes the step of contacting the gas stream with aqueous and gaseous ammonia in a closed vessel in the presence of solid iron. An apparatus for removing hydrogen sulphide and carbon dioxide from a gas stream includes a closed vessel for containing aqueous and gaseous ammonia and an iron source. The vessel is partitioned into inlet and outlet chambers and may itself serve as the iron source.

11 Claims, 4 Drawing Sheets

METHOD AND APPARATUS FOR HYDROGEN SULPHIDE REMOVAL

BACKGROUND OF INVENTION

The present invention relates to a method and apparatus for removing acid gases including hydrogen sulphide and carbon dioxide from a gas stream. In particular, it relates to the treatment of gas streams emanating from produced or stored unrefined crude petroleum, or from a produced natural gas stream or from other sources.

Crude oil is a mixture of many hydrocarbon liquids and gases entrained or dissolved in the liquids. Such gases include lower alkanes (methane, C1; ethane, C2; propane, C3; butane, C4) as well as carbon dioxide and hydrogen sulphide. The liquids are typically mid-range hydrocarbons, (C5 to C7) and higher-level hydrocarbons (C8 and above). Mid-range hydrocarbons (pentane, C5, hexane, C6 and heptane, C7) are normally in a liquid state at room temperature but have significant vapor pressures at ambient temperatures and therefore contribute to the vapor phase in the mixture of gases above the liquid crude. Other gases entrained in oil include hydrogen sulfide. Landfill gas contains mainly $CO_2$ and methane. Emissions from coal-fired and most oil refining operations contain mainly $CO_2$ and $SO_2$.

Some of the gases in crude petroleum, especially hydrogen sulphide, are extremely toxic and must be separated from the crude oil before shipment to a refinery. Typically, hydrogen sulphide in crude oil storage tanks is disposed by partial incineration in a flare stack, in the field. The flaring process burns the hydrocarbons, hydrogen sulphide, hydrogen, and any other flammable vapors in the produced gas stream. Unfortunately most flaring processes involve low temperature, low pressure and incomplete combustion of hydrocarbon gases in particular, as evidenced by the orange color seen in flare stack flames, which is typical of incandescent carbon. Since the gas stream entering the flares typically contains a flame retardant in the form of carbon dioxide, oxygen from the air is less able to react with the hydrocarbons from the gas stream. This results in only partial combustion of some of the flared gases producing carbon monoxide, carbon plus water and sulfur dioxide from hydrogen sulphide combustion. Complete combustion or incineration of acidic hydrocarbons produces sulfur dioxide, water and carbon dioxide. Considering how noxious the by-products produced by the flaring process are, flaring and/or incineration are only marginal improvements over simply letting the gas stream into the atmosphere. Both carbon dioxide and sulfur dioxide, each for their own reasons, are serious industrial pollutants today worldwide.

Produced natural gas at the wellhead often contains hydrogen sulphide. Small amounts of hydrogen sulphide are routinely removed from produced gas before distribution to customers by passing it through heated amine scrubbers at a significant capital and operating cost. Large amounts of hydrogen sulphide and other undesirable gases in produced gas are much more expensive to remove. Often gas wells with high $H_2S$ and/or $CO_2$ to hydrocarbon gas ratios are left dormant because of the high cost of $H_2S$ and/or $CO_2$ removal.

The use of ammonia to remove hydrogen sulphide is well known, however, it has not been considered an efficient process because the high disassociation pressure of the resulting ammonium sulphide required large amounts of ammonia and water to maintain the reaction equilibrium in favour of ammonium sulphide.

Alternatively, as disclosed in U.S. Pat. No. 2,866,679 issued to Lamont, Dec. 30, 1958, a solution to this problem involves maintaining the ammonia-hydrogen sulphide reaction at very high pressure, in the order of 3500 psia. Working at such high pressures has its disadvantages as it requires pressure-rated vessels and piping and introduces additional cost, complexity and risk to the operation.

It is also known to remove hydrogen sulphide from gases by contacting them with iron oxide in the form of pellets, powder or iron oxide sponge. Iron sulphide is formed which is then reacted with oxygen to regenerate the iron oxide and form elemental sulfur. This process does not affect or remove other acid gases such as carbon dioxide. Also, the removal of spent iron oxide sponge impregnated with sulfur is a difficult and noxious task.

Therefore, there is a need in the art for a method and apparatus for efficiently removing acid gases including $H_2S$ and $CO_2$, which does not involve incineration and is cost-effective. Simultaneous removal of $H_2S$ and $CO_2$ is particularly desirable due to $CO_2$ being a serious pollutant, and a flame retardant in any combustion process. It would be advantageous if the apparatus were compact and portable allowing installation and practice of the method on a relatively small scale. Such a method and apparatus may permit the reclamation of low volume gas wells previously deemed uneconomic.

SUMMARY OF INVENTION

We have found that acid gas removal may be efficiently and effectively accomplished by contacting a gas stream comprising the acid gas or gases with gaseous and aqueous ammonia in the presence of solid iron, preferably but not necessarily at substantially standard pressure and ambient temperature. The presence of solid iron appears to have surprising and unexpected beneficial effects on the ability of the ammonia to react with the acid gas or gases and to remove it from the gas stream.

Therefore, in one aspect, the invention comprises a method for removing an acid gas from a gas stream comprising the steps of:

(a) providing a closed reaction vessel having a gas inlet and a gas outlet;

(b) partially filling the vessel with a solution of ammonia such that the vessel contains a liquid phase of dissolved ammonia and a gas phase of ammonia;

(c) providing a source of solid iron in contact with either or both of the gas and liquid phases;

(d) introducing the gas stream into the gas inlet and contacting the gas stream with the gas phase and liquid phase; and (e) recovering the purified gas stream from the gas outlet.

Where the acid gas comprises hydrogen sulphide, it is believed that the overall reactions taking place in this process are as follows:

$$NH_3(g)+H_2S(g)\rightarrow NH_4HS(aq)\text{(dissociates to ammonium ions and bisulphide ions into solution)} \quad (1)$$

$$2NH_4^{+1}(aq)+2HS^{-1}(aq)+Fe(s)=FeS(s)+H2(g)Fe^{+2}(aq)+2S^{-2}(aq)+H_2(g)+2NH_4^{+1}(aq) \quad (2a)$$

$$Fe^{+2}(aq)+S^{-2}(aq)=FeS(s) \quad (2b)$$

If carbon dioxide is also present in the gas stream, it is believed that carbon dioxide is removed through the following reaction:

$$NH_3(g)+CO_2(g)+H_2O(l)=NH_4HCO_3 \quad (3)$$

In a preferred embodiment, an amount of a strong base such as potassium hydroxide may be added to the liquid phase to assist in the removal of hydrogen sulphide through the following reaction:

$$2KOH(aq)+H_2S(g)=K_2S(aq)+2H_2O(l) \quad (4)$$

In a preferred embodiment, a surfactant may be added to the liquid phase to control the effervescence of the ammonia from the liquid phase to the gas phase.

In another aspect, the invention comprises an apparatus for scrubbing acid gas from a gas stream comprising:

(a) a closed reaction vessel for containing a treatment fluid comprising aqueous and gaseous ammonia, said vessel having at least one reverse weir dividing the vessel into at least two chambers and having a gas inlet in one chamber and a gas outlet in another chamber; and (b) a source of solid iron within the vessel wherein said iron source may be in contact with either of or both the aqueous and gas phases of the treatment fluid.

In one embodiment, the source of solid iron is the interior surface of the vessel itself, which may be comprised of uncoated low carbon steel. In one embodiment, the ammonia solution may also comprise a surfactant or a strong base or both a surfactant and a strong base.

In one embodiment, the apparatus may further comprise a gas outlet comprising a baffle tower. The baffle tower may include a tower having a plurality of transversely extending baffles which alternate from opposing sides of the tower to cause the gas stream to divert through a circuitous path through the tower. In a particular embodiment, the tower is square in cross-section and the baffles are angled downwardly.

BRIEF DESCRIPTION OF DRAWINGS

The invention will now be described by way of an exemplary embodiment with reference to the accompanying simplified, diagrammatic, not-to-scale drawings. In the drawings.

DETAILED DESCRIPTION

Figure 1:
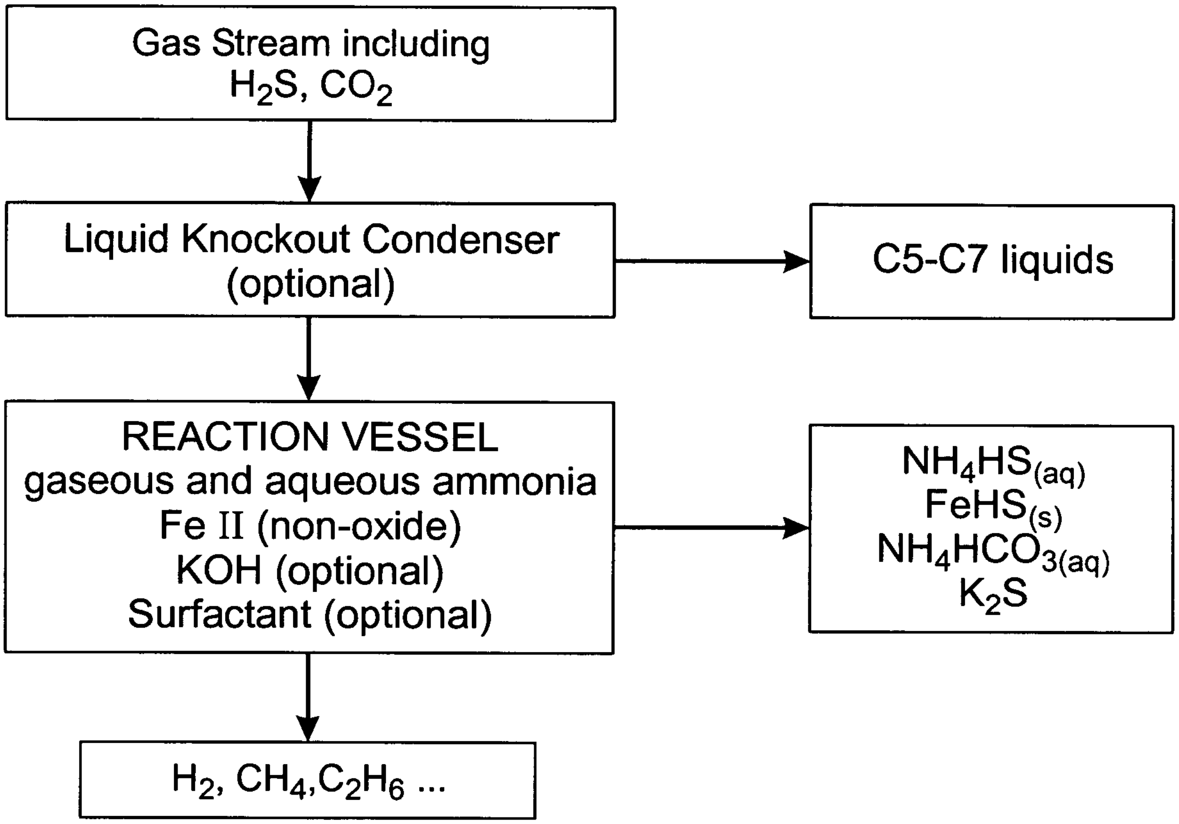
FIG. 1 is a schematic representation of the process of the present invention.

Uhe present invention provides for methods and apparatus for treating a gas stream to remove hydrogen sulphide and other acid gases from the gas stream. When describing the present invention, the following terms have the following meanings, unless indicated otherwise. All terms not defined herein have their common art-recognized meanings.

A. Definitions

The term “acid gas” refers to compounds which normally exist as a gas at standard (25° C.) ambient temperature and pressures (101.1 kPa) and which dissolve in water to ffor-macidic solutions.

The term “weir” refers to a barrier across a closed vessel which functions to contain liquid on one side of the weir until the liquid reaches a level higher than the weir, at which point some liquid will spill over the weir to the other side of the weir. A “reverse weir” is a barrier across a closed vessel containing a liquid which functions to contain gas on one side of the weir until the gas reaches a level lower than the reverse weir at which point some gas will pass under the reverse weir to the other side of the weir.

B. Description

In its method form, the invention comprises the treatment of a gas stream to remove acid gases by contacting the gas stream with gaseous and aqueous ammonia in the presence of solid iron. The present invention has primary application to the removal of hydrogen sulphide and carbon dioxide from a gas stream emanating from produced or stored unrefined crude petroleum oil. The present invention may also be adapted to treat sour natural gas at the wellhead or any other source of undesirable acid gases, which may include from air or gaseous clean-out operations performed within existing wells where foam and/or liquids may be used as viscosifying carrying agents, from under-balanced air or gaseous drilling of a well where foam and/or liquids may be used as viscosifying carrying agents, from drill stem testing or production testing or from any other waste gas streams such as well workovers, well recompletions, well completions, well pressure transient surveys, flowline/pipeline decompressions and evacuations, oil and gas plant maintenance turn-arounds, casing gas venting, truck venting or automotive exhaust gas emissions.

In one embodiment, the acid gases in the present invention are removed by contact with gaseous ammonia in the presence of iron, under low or moderate pressure, at ambient temperatures in a closed system. The system is closed to atmospheric oxygen and nitrogen, except for any nitrogen and oxygen which may be part of the gas stream being treated. The iron may be provided in the form of carbon steel and preferably low carbon steel where the carbon and chromium content each do not exceed about 0.07%. Those skilled in the art may readily adapt the present invention to treat high-pressure gas streams by utilizing pressure rated vessels and appropriate inlet and outlet fittings. Such adaptations are intended to be included within the scope of the invention claimed.

Without being limited to a theory, it is believed that the ammonia, evolved from aqueous ammonia solution, and hydrogen sulphide react, in the presence of solid iron to form ammonium bisulphide (ammonium hydrogen sulphide). The ammonium bisulphide is very soluble in water and therefore will dissolve and immediately dissociate into ammonium and bisulphide ions. Bisulphide ions do not dissociate readily into hydrogen ions and sulphide ions, but some bisulphide ions will react with iron to form iron II ions, likely by the action of the hydrogen in the bisulphide ions on the iron, i.e., making iron more positive by removing two electrons from each iron atom. This leaves sulphide ions and iron II ions in proximity of each other. Since iron II sulphide is insoluble in water, iron II sulphide precipitates. Hydrogen gas will be a by-product of this reaction.

Another perspective is that the hydrogen sulphide gas reacts with the ammonia gas, in the presence of water vapour and iron in low carbon steel, to produce hydrated ammonium ions and hydrated bisulphide ions. Even though many steps are likely involved in these reactions, in the system, the reactions described may be good approximations of overall processes. The actual mechanism or mechanisms of the reactions occurring in the system, depend on the ambient temperature, moisture, pH of the solution, and gas concentrations in the reactor, at a particular point in time. The claimed invention is not intended to be limited by any specific reactions or mechanisms described or suggested herein.

It is also believed, without being limited to a theory, that the carbon dioxide in the gas stream also reacts with ammonia, but more slowly than does the hydrogen sulphide, to form mostly ammonium bicarbonate. This reaction likely takes place in the gas phase but is assisted by the presence of solid iron. Since iron is a crystalline substance, unlike pipe coatings or plastic pipes such as Teflon™ coating or ABS plastic, the ammonium bicarbonate uses the iron only as a crystallisation site. Ammonium bicarbonate is also soluble in most aqueous solutions.

In one embodiment, the above-described processes take place in a closed vessel, at substantially atmospheric pressure and at ambient temperature. In a typical application, the pressure may be slightly elevated as a result of the incoming gas stream pressure but only slightly so. Therefore, it is not necessary for the vessel to be pressure-rated. However, the present invention is not limited to atmospheric or low pressure applications. The chemical reactions appear to be primarily exothermic so that the process temperature may also be slightly elevated. It is believed that internal vessel temperatures do not exceed 50° C. during operation.

Figure 2:
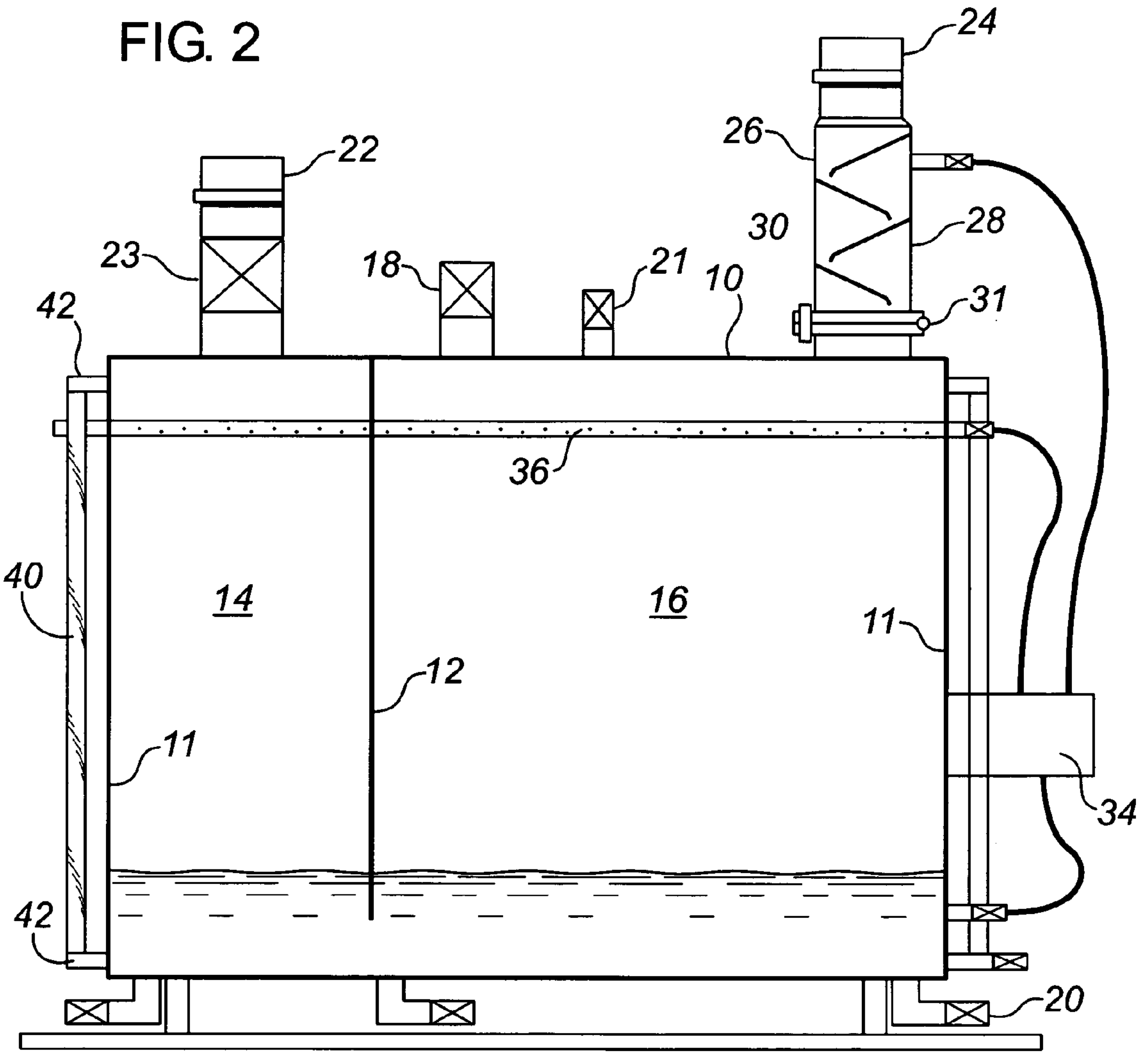
FIG. 2 is a cross-sectional view of an embodiment of the invention in its apparatus form.
Figure 2A:
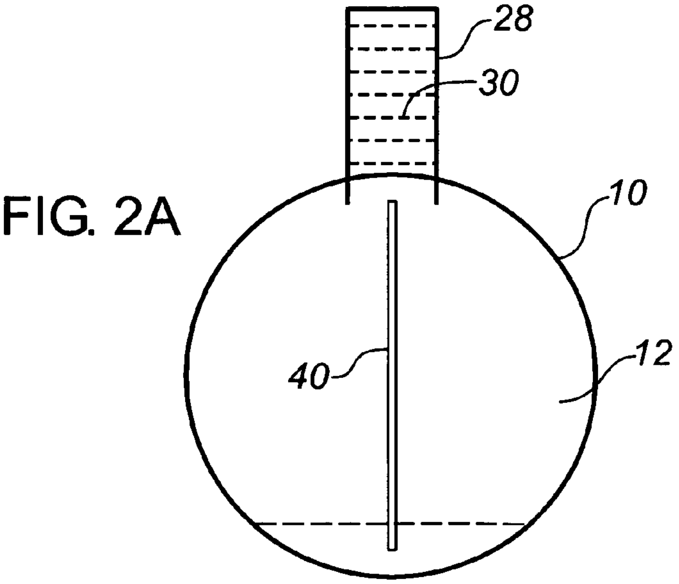
FIG. 2A is an end view of the embodiment shown in FIG. 2.

In its apparatus form, one embodiment of the invention is represented in FIG. 2 as a closed reactor vessel (10). The vessel is made from low carbon steel and may preferably be formed, but not necessarily, as a horizontally cylindrical vessel having end walls (11). In one embodiment, the vessel is partitioned internally by a single reverse weir (12) to create an inlet chamber (14) and a downstream outlet chamber (16). The reverse weir (12) leaves a small opening at the bottom permitting fluid communication between the inlet and outlet chambers. Preferably, the inlet chamber is smaller than the outlet chamber and more preferably is about one-half the size of the outlet chamber.

The reverse weir (12) is preferably transverse and vertical. However, it may be diagonal or longitudinal in orientation and offset from the vertical in alternative embodiments.

A coupling (18) on top of the vessel (10) may be used to introduce fluids into the vessel while another coupling (20) on the bottom of the vessel may be used to withdraw fluids when necessary or desired. A pressure relief valve or vent valve (21) may be provided.

In one embodiment, the gas stream passes through the vessel (10) only under the pressure of the incoming gas stream. If necessary or desired to increase the flow rate, the gas stream may be pressurised upstream of the vessel (10) by any known or conventional means. Alternatively, if the pressure of the incoming gas stream is too great, resulting in excessive flow rates through the vessel (10), it may be necessary or desirable to downregulate the pressure by any known or conventional means.

A gas inlet (22) with a ball valve (23) is provided at the top of the inlet chamber (14). In one embodiment, the gas inlet is a coupling (22), which connects to the gas stream source. A gas outlet (24) is provided at the top of the outlet chamber. In one embodiment, the gas outlet includes a baffle tower (26) in which residual gas scrubbing takes place, predominantly of carbon dioxide if it is present in the gas stream. The baffle tower (26) comprises of a substantially vertical tower (28) having a plurality of internal baffles (30), which interrupt and divert the gas flow as it passes through the tower (28). In a preferred embodiment, the tower (28) comprises an elongated square insert having a length to width ratio of about 3.5:1. The top of the tower (28) is sealed except for a coupling (32) for the gas exit. There are a plurality of baffles (30), each of which transverses the tower (28), preferably angled downward at about 30°. The baffles alternate from each side of the tower as is illustrated in FIG. 2. As will be appreciated, the gas phase undergoes significant turbulence, and therefore mixing, as it passes through the baffle tower (26). Preferably, the baffles (30) and tower (28) are made from the same low carbon steel as the vessel and are uncoated. It is believed that the iron in the low carbon steel facilitates the reaction of carbon dioxide and ammonia, evidenced by the deposition of ammonium bicarbonate on the baffles during operation.

In one embodiment, the baffle tower (26) may be hinged (31) to open up to facilitate cleaning the baffle tower (26).

Figure 4:
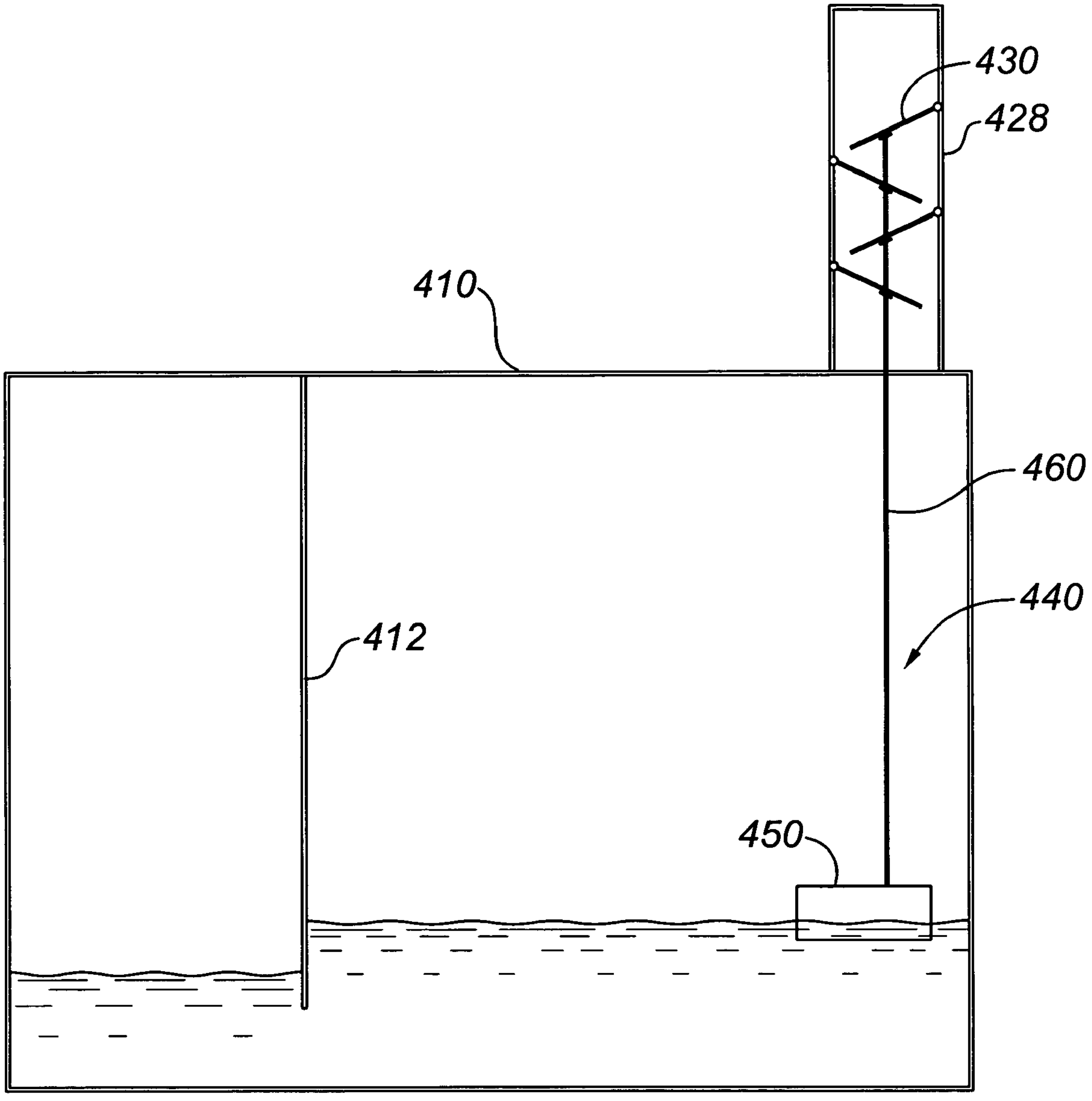
FIG. 4 is a cross-sectional view of another alternative embodiment of the apparatus.

In another embodiment, a vessel (410) having a reverse weir (412) is shown in FIG. 4. In this embodiment, the baffles (430) may be hinged or flexibly attached to the tower (428) insert and means (440) provided for periodically flexing or moving the baffles. This periodic flexing of the baffles may assist in removing solids, which have encrusted onto the baffles. As seen in FIG. 4, one example of a non-powered flexing means comprises a float (450) which floats on the liquid in the outlet chamber and which is connected to the baffles by a push rod (460). The fluctuation in the liquid level in the outlet chamber will cause the baffles to be moved up and down by the float (450) and push rod (460).

In one embodiment, a liquid phase re-circulation system is used to increase the concentration of ammonia in the gas phase thereby increasing the exposure of the acid gases to ammonia. The re-circulation system may also function to wash any solids which form on the inner surface of the vessel (10) into the liquid phase. The re-circulation system includes a small pump (34) which draws fluid from the bottom of the vessel and pumps it through a spray bar (36) having a plurality of perforations acting as nozzles. The spray bar (36) is situated near the top of the vessel and sprays the liquid through the gas phase and onto the inner surface of the vessel. Alternatively or in addition to the spray bar (36), the pump may occasionally pump liquid to the top of the baffle tower (28) where it is sprayed onto the baffles and allowed to trickle down through the baffle tower. Power for the pump may be supplied from any electrical source, air source, natural gas source or photovoltaic cells (not shown) if power lines are not available at the installation site.

The re-circulation system may operate continuously or may be operated periodically under control of a timer or a control system (not shown), which may employ sensors to determine conditions within the vessel.

The incoming gas stream builds up in the inlet chamber (14), mixing and reacting with the ammonia in the gas phase, and lowering the level of the liquid in the inlet chamber (14). Because the vessel (10) is closed, the liquid level in the outlet chamber (16) rises by a corresponding volume. When the liquid level is driven below the level of the reverse weir (12) between the inlet and outlet chambers (14, 16), a quantity of gas is transferred to the outlet chamber (16) and replaced in the inlet chamber (14) by an equivalent volume of liquid. This periodic transfer of gas within the vessel agitates the liquid in both chambers, releases ammonia from the liquid phase, and mixes the gas phase in both chambers.

In one embodiment, the vessel (10) is made from 36,000-psi low carbon steel and is horizontally cylindrical. The vessel may be approximately 38 inches in diameter and 45 inches long. As such, the internal volume is approximately 29 cubic feet or 817 liters. The reverse weir (12) transversely divides the vessel (10) into inlet and outlet chambers where the outlet chamber (16) is approximately twice the size of the inlet chamber (14). It is to be understood that the dimensions or orientation of the vessel and the chambers are not limitations of the claimed invention unless specifically claimed to be so. The size of the vessel may be tailored to the expected gas volume and flow rate of the particular source of gas stream to be treated.

The vessel may be divided into more than two chambers. Additional chambers may result in more efficient scrubbing of acid gases and/or greater capacity to retain the sulphides and carbonates produced in the scrubbing process. In another embodiment, the vessel is divided into three chambers by two reverse weirs. The chambers may increase in size from the inlet chamber to the middle chamber and finally the outlet chamber.

Figure 3:
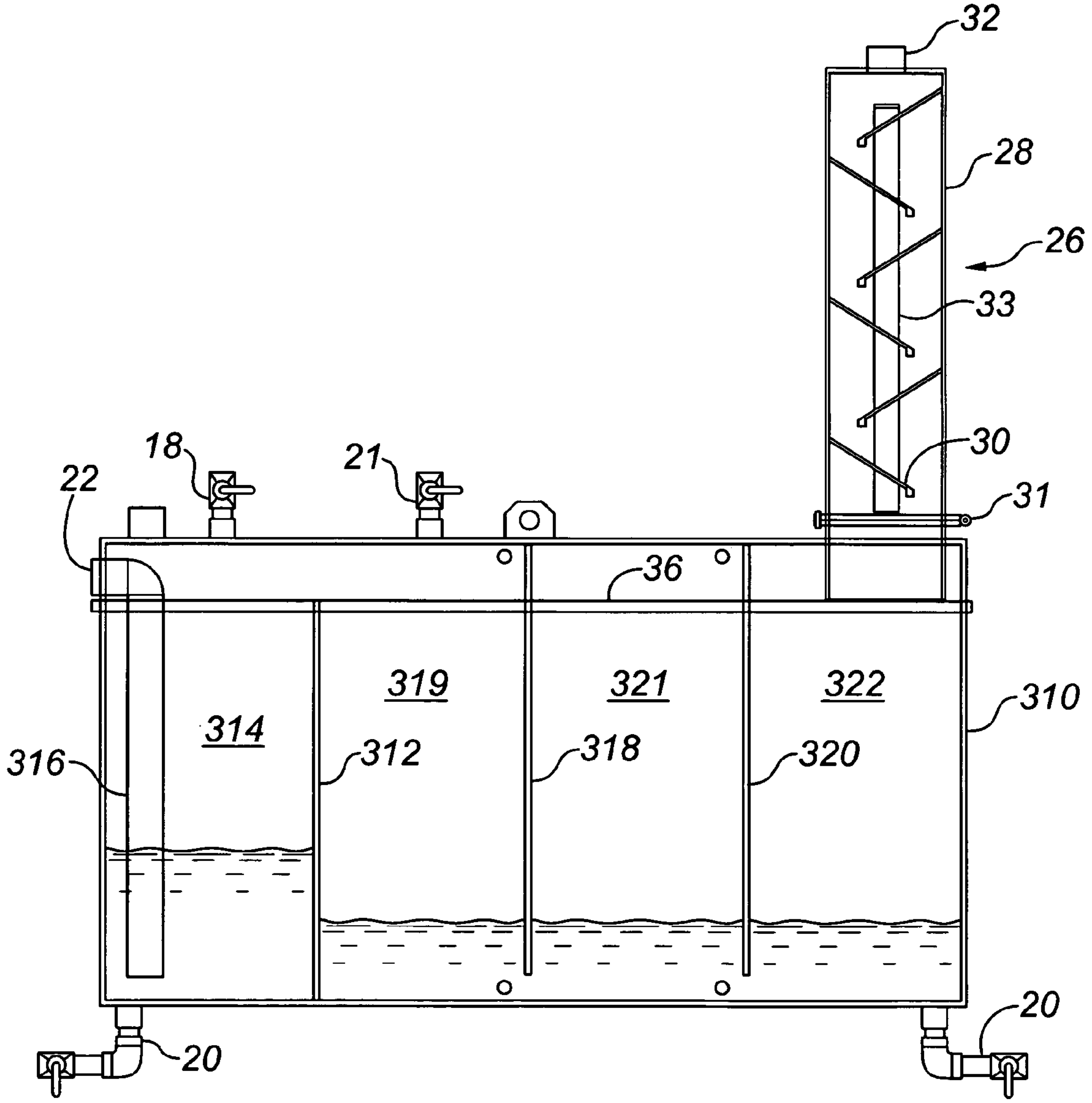
FIG. 3 is a cross-sectional view of an alternative embodiment of the apparatus.

In another embodiment employing a vessel of larger capacity, as seen in FIG. 3, the vessel (310) is horizontally cylindrical, approximately 72 inches long and approximately 38 inches in diameter. The vessel is internally divided into four chambers by three weirs. The first weir (312) extends upwardly to separate the gas inlet chamber (314) leaving a gap at the top of the vessel. The gas inlet chamber includes a quantity of ammonia solution as do the downstream chambers. The gas inlet includes a downcomer (316) to bubble the incoming gas through the liquid phase in the gas inlet chamber (314). The second (318) and third (320) weirs are reverse weirs. In this embodiment, the incoming gas accumulates in the gas inlet chamber (314) and the second chamber (319) until the liquid level in the second chamber falls below the level of the second weir (318). A quantity of gas then transfers to the third chamber (321). When sufficient gas has accumulated in the third chamber (321) to drive the liquid level below the level of the third weir (320), a quantity of gas then transfers to the fourth (gas outlet) chamber (322). Preferably, the gap underneath the third weir (320) is higher than the gap left by the second weir (318) in order to prevent reverse transfer of gas within the vessel (310).

Although a re-circulation system is not shown in FIG. 3, it will be apparent that a pump system as shown in FIG. 2 may be adapted to the embodiment shown in FIG. 3 or any other embodiment of the invention. In this embodiment, an internal control structure support (33) for the baffles (30) is provided within the baffle tower (28).

In one embodiment, a sight glass (40) may be attached to the vessel to provide a means for visually inspecting the liquid level within the vessel (10). The sight glass may be attached to couplings (42) near the top and bottom of the vessel, on the end of the vessel.

In one embodiment, the vessel (10) is compact and designed to be portable by being skid mounted. It may therefore be easily transported from site to site or replaced at any installation as necessary.

In use, the vessel (10) is partially filled with a concentrated ammonia solution to a level which at least covers the gap of the reverse weir (12), or the highest reverse weir, if there are more than one. The ammonia solution preferably has a concentration of ammonia of about 25 grams per 100 ml of solution or 26 BE. Preferably, the vessel is filled with the ammonia solution between about 2% to about 20% of its volume. More preferably, the vessel is filled to about 5% to about 15% of its volume with the ammonia solution. Because of the significant vapor pressure of ammonia, which largely remains unreacted and in molecular form in water, much as carbon dioxide does in water, any rise in temperature will accelerate the effervescence of ammonia, and cause a significant portion of the ammonia to effervesce over time and occupy the vessel as the gas phase. This movement of ammonia to the gas phase is a natural tendency (it is an entropy increase) and is possible through a wide range of temperatures.

Optionally, an amount of a strong base such as potassium hydroxide may be added to increase the basicity of the liquid phase and aid in capturing additional hydrogen sulphide at the liquid phase-gas phase interface. Potassium hydroxide will react with hydrogen sulphide to produce potassium sulphide and water. The hydroxide ions from potassium hydroxide will also shift the ammonia-hydrated ammonium ion equilibrium toward ammonia, making more ammonia gas available to react with hydrogen sulphide. In one embodiment, saturated KOH solution is added to the aqueous ammonia in an amount between about 1% to about 2% by volume.

In one embodiment, the liquid phase may also comprise a surfactant to control the evaporation rate of the ammonia from the liquid phase. The surfactant will cause a foam layer to float on the liquid phase, thereby limiting ammonia evaporation from the liquid phase. Suitable surfactants include nonionic, anionic or cationic surface tension reducing agents such as fatty acid soaps. Preferred surfactants are ones that increase in viscosity as their temperature rises. Silicon based surfactants which increase in viscosity with a concomitant rise in surface tension as the temperature rises, may assist to prevent the release of excess gaseous ammonia within the vessel.

It is important to regulate the inlet pressure if the source gas stream is pressurized to limit the flow rate of gases through the vessel. If the flow rate of gases is too high there may be insufficient contact time between the reactants to effectively remove hydrogen sulphide and carbon dioxide. We have found that a vessel having a capacity of about 29 cubic feet may effectively treat 10,000 cubic feet of incoming gas in 24 hours where the incoming gas stream includes hydrogen sulphide at about 150,000 PPM and carbon dioxide at about 265,000 PPM (see examples below). The upper limit of gas flow rate may vary with the concentration of the hydrogen sulfidesulphide and carbon dioxide in the incoming gas stream and with other factors as may be determined by one skilled in the art.

In one embodiment, the vessel may itself serve as the source of solid iron if the vessel comprises uncoated low carbon steel. In a preferred embodiment, the low carbon steel comprises less than about 0.07% carbon and less than about 0.07% chromium. The vessel itself is thus sacrificed by the operation of the system and must be replaced when the vessel wall thickness reaches approximately 3 mm. Alternatively, or in addition, low carbon steel ingots or other forms such as pellets or sheets may be placed within the vessel to serve as the iron source. In one embodiment, the ingots may be placed on a tray in a downstream chamber above the liquid level, so that the ingots are washed in the solution when the solution level rises due to in-flowing gas pressure. This provides an iron source in addition to the reactor itself.

Because the vessel is closed, there is no source of oxygen other than what is present in the gas stream being treated. Therefore, the iron within the vessel is substantially free of iron oxide and is available to the process in its solid, non-oxide form.

The liquid phase may be withdrawn at regular intervals along with any precipitated solids such as iron sulphide, and dissolved ammonium bicarbonate, dissolved ammonium bisulphide, and dissolved ammonium sulphide and replaced with a fresh charge of aqueous ammonia, which may include a surfactant and a strong base as described above.

It may be desirable or necessary to condense mid-alkane vapours such as pentane, hexane and heptane from the incoming gas stream before they reach the vessel. If such vapours condense within the vessel, there is a possibility that they could coat or foul the iron sources and prevent or inhibit the desired chemical processes of the present invention. Condensers to knock out such C5 to C7 hydrocarbons, while leaving lower hydrocarbons in the gas phase, are well known in the art.

In the examples presented below, the present invention is capable of reducing hydrogen sulphide to near undetectable levels of 0–5 PPM but certainly below the safe eight hour working threshold level of 10 PPM and $CO_2$ down to 0 PPM. If it is necessary or desirable to scrub any residual hydrogen sulphide out of the gas stream, the effluent gas from the vessel may be passed through additional vessels of any configuration containing ammonia or a surface tension reducing surfactant or both.

The resulting effluent gas which has been scrubbed of hydrogen sulphide and carbon dioxide will be predominantly natural gas which may then be burned in an electrical generating system sent to market or used to fuel on-site facility burners.

EXAMPLES

The following examples are representative of the claimed invention and are not intended to be limiting in any manner.

Example 1

A horizontally cylindrical vessel formed of 36,000 psi uncoated low carbon steel was provided, substantially as illustrated in FIG. 2. A 60 liter charge of a 26 BE ammonia solution including 0.2% surfactant and 1.75% potassium hydroxide (v:v concentrated KOH) was connected to the gas effluent from a crude oil storage tank. The incoming gas pressure was approximately 1 to 3 ounces above atmospheric pressure. A small pump powered by natural gas was used to re-circulate the liquid phase through both a spray bar and to the top of the baffle tower as described above. The incoming gas was tested using a laboratory gas chromatograph showing the gas concentrations shown in Table 1 below. The effluent from the gas outlet was tested both with a field Gas Tec™ unit and with a laboratory gas chromatograph. As is apparent, the hydrogen sulphide concentration was reduced to a negligible level and carbon dioxide reduced to undetectable level.

TABLE 1

| Gases | Chromatographic Gas Concentration Before REACTOR (PPM) | Gas Tec ™ Gas Concentration After Scrubbing (PPM) | Chromatographic Gas Concentrations; Output from REACTOR (PPM) |
|---|---|---|---|
| Hydrogen Sulphide | 148,400 | 28 | 0.0 |
| Carbon Dioxide | 266,300 | 0 | 0.0 |
| Hydrogen | 700 | N/A | 3000 |

A black precipitated solid was found in the bottom of the vessel and determined to be iron sulphide. Also, ammonium bicarbonate was found within the vessel and encrusted to the baffles in the baffle tower indicating that the ammonia—carbon dioxide reaction took place in the baffle tower. After desiccation, the liquid phase was found to include ammonium bisulphide, ammonium sulphide, iron II sulphide, and ammonium bicarbonate, all in solid crystalline form.

Example 2

Under conditions similar to that in the above example, except that no fluid re-circulation system was provided, the following gas concentrations as shown in Table 2 were recorded before and after treatment in the vessel

TABLE 2

| GASES | Chromatographic Gas Concentration Before REACTOR (PPM) | Gas Tec ™ Gas Concentration After Scrubbing (PPM) | Chromatographic Gas Concentrations; Output from REACTOR (PPM) |
|---|---|---|---|
| Hydrogen Sulphide | 110,100 | 0 | 0 |
| Carbon Dioxide | 121,300 | 0 | 0 |
| Hydrogen | 0 | n/a | 4,400 |

After desiccation of the liquid phase, it was found to include ammonium bisulphide, ammonium sulphide, iron II sulphide, and ammonium bicarbonate, all in solid crystalline form.

As will be apparent to those skilled in the art, various modifications, adaptations and variations of the foregoing specific disclosure can be made without departing from the scope of the invention claimed herein.

The invention claimed is:

1. An apparatus for scrubbing acid gas from a gas stream comprising:

(a) a closed reaction vessel for containing a treatment fluid comprising aqueous and gaseous ammonia, said vessel having at least one reverse weir dividing the vessel into at least two chambers and having a gas inlet in one chamber and a gas outlet in another chamber;

(b) said at least one reverse weir allowing fluid communication between the at least two chambers below the at least one reverse weir, but not above the at least one reverse weir; and (b) a source of solid iron within the vessel wherein said iron source may be in contact with either of or both the aqueous and gas phases of the treatment fluid.

2. The apparatus of claim 1 wherein the vessel comprises low carbon steel and wherein the source of solid iron comprises an inner surface of the vessel.

3. The apparatus of claim 1 wherein the vessel is a horizontally elongate cylinder and the reverse weir is transverse and substantially vertical.

4. The apparatus of claim 1 further comprising a tower baffle system associated with the gas outlet wherein the tower baffle system comprises an elongate outlet tower and a plurality of baffles which each partially extends across the outlet tower, diverting the gas stream along a circuitous path within the outlet tower.

5. The apparatus of claim 4 wherein the tower baffle system comprises uncoated low carbon steel.

6. The apparatus of claim 4 further comprising baffle flexing means.

7. The apparatus of claim 6 wherein the baffle flexing means comprises a float and a push rod connected to the float and to at least one baffle such that vertical movement of the float causes the at least one baffle to move or flex.

8. The apparatus of claim 1 further comprising a liquid re-circulation system comprising a pump, means for powering the pump and a sprinkler bar wherein the pump may draw liquid from the bottom of the vessel and distribute the liquid through the sprinkler bar which is disposed at or near the top of the vessel.

9. The apparatus of claim 8 wherein the sprinkler bar sprays the liquid onto the inner surface of the vessel and/or through the gas phase.

10. The apparatus of claim 1 wherein the vessel further comprises a first weir defining an inlet chamber for containing some liquid treatment fluid, a downcomer for introducing the gas stream into the liquid treatment fluid in the inlet chamber, and at least two reverse weirs separating the remainder of the vessel into three chambers downstream from the inlet chamber.

11. The apparatus of claim 1 further comprising a condenser connected upstream of the gas inlet for removing condensable hydrocarbon vapours from the gas stream before the gas stream enters the vessel.

* * * * *